United States Patent
Holbrook

(10) Patent No.: US 7,152,362 B2
(45) Date of Patent: Dec. 26, 2006

(54) TROLLING RELEASE DEVICE

(75) Inventor: Michael D. Holbrook, Kingston, OH (US)

(73) Assignee: Mastergear, Ltd., Kingston, OH (US)

( * ) Notice: Subject to any disclaimer, the term of this patent is extended or adjusted under 35 U.S.C. 154(b) by 0 days.

(21) Appl. No.: 10/974,274

(22) Filed: Oct. 27, 2004

(65) Prior Publication Data

US 2006/0086036 A1    Apr. 27, 2006

(51) Int. Cl.
*A01K 93/00* (2006.01)
(52) U.S. Cl. .................................... 43/43.12
(58) Field of Classification Search .............. 43/43.12, 43/43.13, 27.4; 24/115 K, 582.1, 369, 563, 24/570, 294, 182, 599.6, 573.5; 83/910, 83/913, 909, 856, 950; 225/91; D22/149
See application file for complete search history.

(56) References Cited

U.S. PATENT DOCUMENTS

| 2,479,448 | A | * | 8/1949 | Woock ........................ 43/17.2 |
| 3,905,148 | A | | 9/1975 | Naone et al. |
| 4,010,569 | A | * | 3/1977 | Finley et al. .............. 43/44.83 |
| 4,113,156 | A | * | 9/1978 | Brito ........................... 224/666 |
| 4,428,142 | A | | 1/1984 | Shedd et al. |
| 4,538,372 | A | * | 9/1985 | Petigoretz .................. 43/27.4 |
| 4,574,516 | A | | 3/1986 | Shedd et al. |
| 4,574,518 | A | | 3/1986 | Shedd et al. |
| 4,611,423 | A | | 9/1986 | Rupp |
| 4,696,124 | A | * | 9/1987 | Wille ........................ 43/43.12 |
| 4,698,933 | A | | 10/1987 | Shaw |
| 4,825,583 | A | | 5/1989 | Kammeraad |
| 4,945,670 | A | | 8/1990 | Wetherald |
| 5,152,095 | A | | 10/1992 | Combs, III |
| 5,163,246 | A | | 11/1992 | Shaw |
| 5,197,223 | A | | 3/1993 | Spurgeon |
| 5,784,826 | A | | 7/1998 | Walker |
| 5,921,015 | A | | 7/1999 | Newell et al. |
| 5,950,349 | A | | 9/1999 | Walker |
| 5,979,104 | A | | 11/1999 | Walker |
| 6,192,619 | B1 | | 2/2001 | Pirkle |
| 6,634,136 | B1 | | 10/2003 | Barrett et al. |
| 6,935,069 | B1 | * | 8/2005 | Jensen ........................ 43/43.12 |
| 6,988,430 | B1 | * | 1/2006 | Putney et al. .................. 81/64 |

FOREIGN PATENT DOCUMENTS

DE    102004022508 A1 * 12/2005

* cited by examiner

*Primary Examiner*—Teri Pham Luu
*Assistant Examiner*—Kimberly S. Smith
(74) *Attorney, Agent, or Firm*—Jason H. Foster; Kremblas, Foster, Phillips & Pollick

(57) ABSTRACT

A trolling release device for use during fishing. A ring of the device has an aperture formed between sidewalls and a slit in one of the sidewalls for extending a line through the sidewall. A handle is mounted to the ring and has peripheral sidewalls with an aperture formed between the sidewalls and a slit in one of the sidewalls of the handle. A string is attached to a fishing line at one end and the opposite end is inserted into the handle aperture. When a fish strikes a lure on the fishing line, the string is cut, thereby releasing the fishing line.

6 Claims, 2 Drawing Sheets

TROLLING RELEASE DEVICE

BACKGROUND OF THE INVENTION

1. Field of the Invention

This invention relates generally to fishing equipment, and more specifically to a fisherman's trolling release device.

2. Description of the Related Art

When fishing for walleye or other fish that tend to be spooked easily by a boat motor, planer board trolling becomes an attractive method for catching the most fish. In using a planer board trolling method, the planer board is mounted to a tow line, which is attached to the boat. The planer board is released into the water while the boat is at a trolling speed, which creates enough force, due to the shape of the board, to pull the planer board laterally away from the sides of the boat to a distance determined by the length of the tow line. Once the planer boards are in place, typically one on each side of the boat, the fisherman releases his lure to a selected distance behind the boat and attaches a release clip to the fishing line.

A conventional release clip has a loop end, which is typically made of a metal shower curtain-like clip mounted to a spring loaded clamp, which can be made from a clothes pin or electrical clip. There are many release clips on the market, however, most have the same standard features as the one described here. The clamp end of the release clip is attached to a rubber band, which is attached to the fishing line, and the loop of the clip is clipped onto the tow line during use.

Once the release clip is in place, the fisherman releases fishing line from the reel, which allows the release clip to slide down the tow line and away from the boat. Finally, the fisherman sets the clicker and drag on his fishing reel and puts the rod in the rod holder of the boat.

When a fish "hits" the line and gets caught on the lure or hook, the fishing line is released from the release clip due to the force of the fish on the lure. This force pulls the fishing line from the clamp of the release clip, and the fishing line is directed to the rear of the boat so as to not tangle with the other line or lines. The fisherman then attempts to land the fish.

After the fishing line is released from the clamp, the clip remains attached to the tow line and slides down the tow line to the planer board where it comes to rest. The fisherman then begins the process of adding another release clip to the tow line in order to reset his fishing line. At the end of the day the clips are retrieved by reeling in the tow lines, and may include unclipping each release clip individually from the tow lines and placing the release clips in a bucket or storage container on the boat.

There are several disadvantages to the conventional release clips on the market. The weight of the accumulated release clips on the planer board tends to weigh the planer boards down, thereby dragging the planer boards toward the rear of the boat. This is undesirable because the rear of the boat is where the fisherman "fights" the fish on their line. If the planer board is near the rear of the boat then the fishing lines attached to the tow line also move toward the rear of the boat causing the fishing lines to become tangled.

In addition, the majority of the conventional release clips have a multitude of mechanical parts. These parts are typically made of metal and begin to rust or wear out quickly and therefore, must be replaced more often. The spring loaded clamp could also fail during trolling, which would release the fishing line prematurely causing the fisherman to lose the use of that line. Also, the conventional release clips are costly to manufacture.

Furthermore, when the fisherman is finished fishing for the day, and he pulls in the tow lines and planer boards, the fisherman has to compress the spring of each clip, move it slightly to the side and then release it before removing the release clip from the tow line. Each of the conventional release clips may have to be removed individually, which can be very time consuming and increases the risk of losing one during removal.

Therefore, there is a need for a device that is light weight and easy to use during planer board fishing.

BRIEF SUMMARY OF THE INVENTION

The invention is a trolling release device for holding a fishing line on a tow line that can be attached to planer boards for taking the fishing line out to the side of the boat and spacing the fishing lines from each other and from the boat.

The device comprises a ring having peripheral sidewalls with an aperture formed between the sidewalls. A radial slit is formed in one of the sidewalls for extending a tow line through the sidewall. The device also has a handle rigidly mounted to the ring. The handle has peripheral sidewalls with an aperture formed between the sidewalls and a radial slit in one of the sidewalls of the handle.

In operation, the ring is mounted to a tow line and a string, which is preferably a rubber band. The rubber band is attached to a fishing line, and the rubber band is inserted into the handle aperture. When a tensile force is applied to the fishing line, such as by a fish hitting the hook or lure on the line, the string is cut by a sharp edge of the sidewall of the handle that is opposite the ring, which releases the fishing line from the trolling release device.

Figure 1:
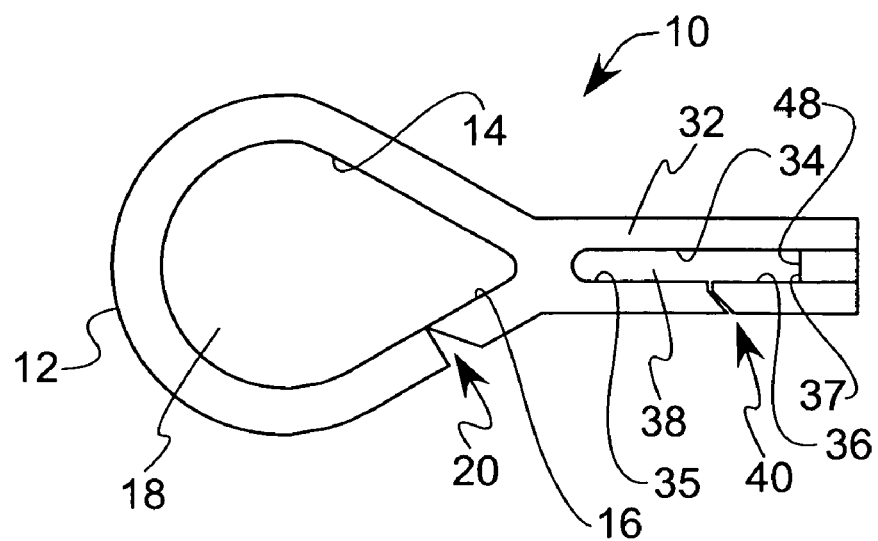
FIG. 1 is a schematic view illustrating the preferred embodiment of the present invention.

In describing the preferred embodiment of the invention, which is illustrated in the drawings, specific terminology will be resorted to for the sake of clarity. However, it is not intended that the invention be limited to the specific term so selected, and it is to be understood that each specific term includes all technical equivalents, which operate in a similar manner to accomplish a similar purpose. For example, the word connected or term similar thereto is often used. They are not limited to direct connection but include connection through other elements where such connection is recognized as being equivalent by those skilled in the art.

DETAILED DESCRIPTION OF THE INVENTION

The invention is a trolling release device 10 that has a ring 12 and a handle 32 illustrated in FIG. 1. The ring 12 has peripheral sidewalls 14 and 16 and an aperture 18 formed between the sidewalls 14 and 16. A radial slit 20 formed in one of the sidewalls allows the sidewalls to be separated to form a gap for extending a tow line 22 through the sidewall. When the slit 20 is opened to form the gap, the sidewall 14 has to be deformed slightly. The sidewall 14 acts as a spring when a force is applied to open the slit 20 and causes the sidewall 14 to return to its original position (shown in FIG. 1) upon release of the force.

The handle 32 is rigidly mounted to the ring 12 and has peripheral sidewalls 34, 35, 36 and 37 with an aperture 38 formed between the sidewalls 34–37. A radial slit 40 is also formed between the sidewalls of the handle 32. The slit 40 allows a user to insert a string into the handle aperture 38 upon deforming the sidewall 35 as described below.

The term "string" as used herein is defined as a long, slender, flexible member that can be cut by a sharp edge and that fits in the aperture 38 of the handle 32. A "string" can be made from a variety of different materials and can have a plurality of physical features. For example, "string" can be flexible and inelastic, such as fishing line, or can be made of rubber and have elastic qualities. In the preferred embodiment of the present invention, the "string" is a conventional rubber band 42 that is inserted into the handle aperture 38. The rubber band 42 is attached to a fishing line 44, which has a lure and hook attached.

Figure 3:
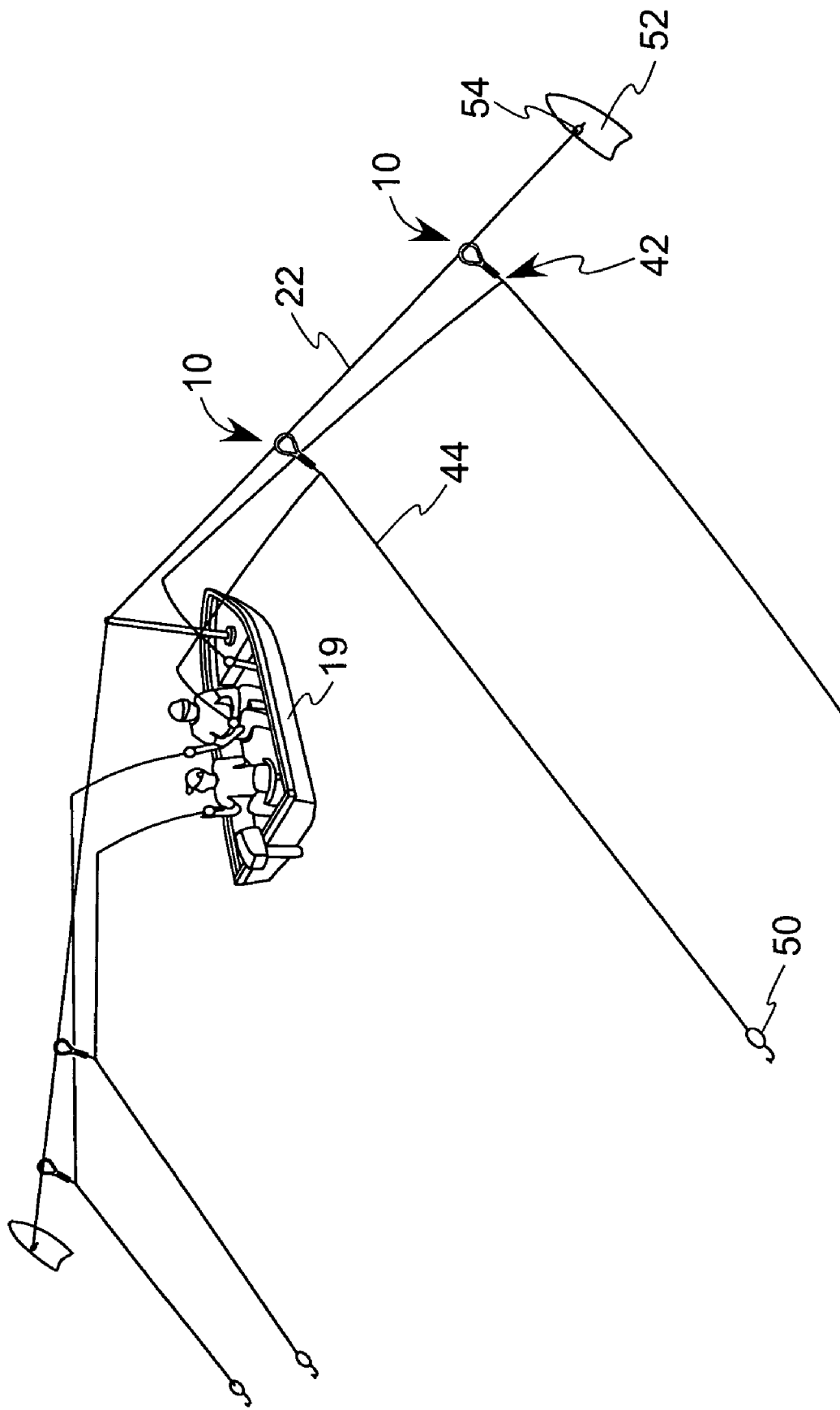
FIG. 3 is a view in perspective of the embodiment of FIG. 1 in use during a fishing operation.

In using the invention with the planer board trolling method, a planer board 52 is mounted to a tow line 22, which is attached to a boat 19 in a conventional manner. The tow line 22 is preferably a cable or rope but can be a bar that extends from the boat 19. The planer board 52 is released into the water while the boat 19 is at a trolling speed, which creates enough lateral force to pull the planer board 52 out from the side of the boat 19 to a distance determined by the length of the tow line 22, as illustrated in FIG. 3. The tow line 22 operates in a conventional manner at a perpendicular or similar angle to the boat 19, which allows fishing lines to be separated from one another during fishing.

Once the planer board 52 is released, preferably one on each side of the boat, the fisherman places the edge of the slit 20 along the tow line 22 and applies a pulling force to the ring 12, which deforms the ring sidewall and opens the slit 20 enough to permit the tow line 22 to enter into the ring aperture 18 through the slit 20. After the tow line 22 has entered the ring aperture 18, the force is released and the slit 20 returns to its original or resting position, thereby closing the ring 12.

The fisherman then releases an appropriate amount of fishing line 44 and once satisfied that enough has been released, attaches the fishing line 44 to the rubber band 42 using a girth hitch knot. This will probably be a large amount of fishing line 44 because this is the portion of the fishing line 44 that contains the lure 50, as illustrated in FIG. 3 and discussed further below.

Once the rubber band 42 is attached to the fishing line 44, the fisherman using the same steps described above for the ring 12 to insert the rubber band 42 into the handle aperture 38 so that the rubber band 42 is looped around the sidewall of the handle 32, opposite the ring 12. If the rubber band 42 is thin and elastic enough, it can be inserted into the handle 32 by deforming only the rubber band 42, not the sidewall 35.

The fisherman then releases more fishing line 44, which will enable the ring 12 to slide easily along the tow line 22 to a desired distance. The amount of fishing line 44 released determines whether the device 10 will be set at a distance closer to or farther away from the boat 19. If using two fishing lines, the first fishing line can be released an amount that is greater than the second fishing line. See FIG. 3.

As the trolling release device 10 slides along the tow line 22, the proximal span of fishing line 44 is pulled at an angle transverse to the axis of the boat 19. When the ring 12 reaches the distance determined by the amount of fishing line released, the angle of the tow line and speed of the boat, all of which are set by the fisherman, it stops moving along the tow line 22. The distal span of fishing line 44, which extends into the water from the rubber band 42 that is inserted in the handle 32 of the device 10, is then pulled directly rearwardly making this distal span of fishing line 44 and lure 50 parallel to the boat 19. The force of the water on the lure, which is produced by trolling the boat 19 at a slow speed, causes the fishing line 44 to remain parallel to the boat 19 while fishing.

Figure 2:
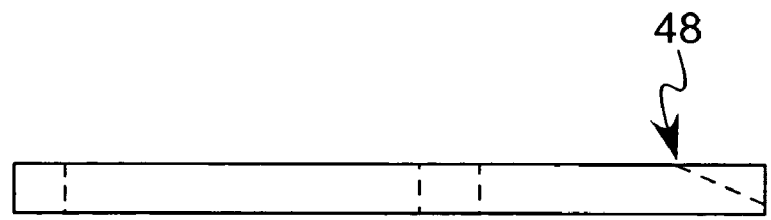
FIG. 2 is a schematic view illustrating the sharp edge of the sidewall of the embodiment of FIG. 1.

Once the fisherman has placed the fishing line on the tow line, he begins fishing. As a fish "hits" the lure 50, a tensile force is applied to the fishing line 44, thereby pulling the rubber band 42 against the sharp edge 48 of the sidewall of the handle 32, illustrated in FIG. 2. This sharp edge cuts the rubber band 42, thereby releasing the fishing line 44 from the trolling release device 10, which causes the fishing line 44 to pass to the rear of the boat 19.

With the fishing line 44 moving toward the rear of the boat 19, the trolling release device 10 slides down the tow line 22 under the force of gravity and encounters one of two obstacles. First, if another trolling release device and fishing line are attached to the tow line 22 outward of the recently released device 10, then the recently released device 10 rests against the stationary device until it receives a hit from a fish and releases its fishing line. However, if there is no other active trolling release device obstructing the travel of the device 10 along the tow line 22, the device 10 slides to the planer board 52. Then another trolling release device and fishing line are attached to the tow line. This process of mounting trolling release devices 10 on the tow line 22 and fishing line 44 continues until the fisherman is finished fishing.

The tow line 22 is mounted to an eyebolt 54, which is rigidly attached to the planer board 52 holding the two together during operation. One advantage of the preferred embodiment of the present invention is that the ring aperture 18 is preferably large enough to slide over the eye bolt 54 and rest upon the planer board 52 after releasing the fishing line 44. Additionally, because of the plastic construction of the device 10, the accumulated trolling release devices 10 do not significantly weigh down the planer board 52, which typically occurs with conventional release devices.

At the end of the fishing day, the fisherman pulls in the tow line 22 and the planer board 52, which have the accumulated trolling release devices 10 attached. The fisherman releases the tow line 22 from the eye bolt 54 of the planer board 52 and the trolling release devices 10 slide off the tow line 22 and the planer board 52 and into a bucket on the boat.

The trolling release device 10 is preferably moulded from a plastic, such as nylon 66, having good memory characteristics, which allows the slits 20 and 40 to return to a closed position after being extended to insert the tow line 22 or string through the slits 20 and 40, respectively. The trolling release device 10 is moulded having significantly wider slits 20 and 40. While the recently moulded plastic is still warm, the device is immediately quenched in a cool water bath, which deforms the sidewalls 14 and 35 and brings the slits 20 and 40 to a closed position. Preferably the slits 20 and 40 are located along the same side of the device, as illustrated in FIG. 1. However, as will be recognized by a person of ordinary skill, the slits 20 and 40 can be located in a variety of locations in the sidewalls of the device.

Figure 4:
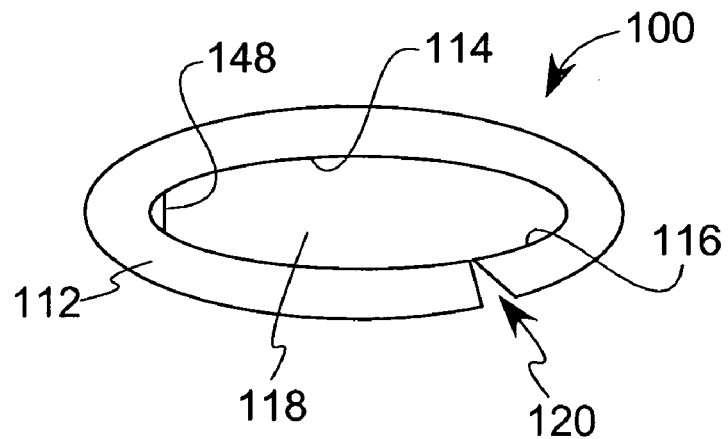
FIG. 4 is a schematic view illustrating an alternative embodiment of the present invention.

The trolling release device 10 can have a variety of alternate shapes. The term "ring" as defined herein can be elongated and have a variety of shapes. In addition, it is contemplated that the ring can have no separate handle and aperture for inserting the rubber band into. For example, as illustrated in FIG. 4, the release device 100 can be a ring 112 that has an aperture 118 between two sidewalls 114 and 116. One of the sidewalls has a slit 120 for receiving the tow line and the rubber band, while another of the sidewalls has a sharp edge 148 for cutting the rubber band during operation. This alternative embodiment eliminates the separate aperture or handle of the preferred embodiment, but has some disadvantages that will be apparent. Further, the ring can be rectangular with the aperture between the sidewalls and sharp edge sidewall. In another alternative, the device could have two rings, each having a slit, and one ring having a sharp edge on a sidewall. As one having ordinary skill in the art will recognize there are a plurality of shapes that the device can take on and still function as the preferred embodiment.

There are several advantages to the preferred embodiment of the present invention. One advantage is that there are no separate moving parts. The invention is moulded in one piece completely from plastic, which not only enables the fisherman to reuse the device a plurality of times, but the device does not rust like conventional devices made from metal. In addition, the weight of the plastic is significantly less than a conventional device keeping the planer boards in their desired locations, to the side of the boat. Further, the slit in the ring enables a fisherman to, almost without looking, mount the ring to the tow line quickly and efficiently.

While certain preferred embodiments of the present invention have been disclosed in detail, it is to be understood that various modifications may be adopted without departing from the spirit of the invention or scope of the following claims.

The invention claimed is:

1. A trolling release device for use during fishing, the trolling release device comprising:
   (a) a ring having peripheral sidewalls with an aperture formed between the sidewalls and a radial slit in one of the sidewalls for extending a tow line through the sidewall and into the aperture;
   (b) a handle rigidly mounted to the ring, the handle having peripheral sidewalls with an aperture formed between the sidewalls and a radial slit in one of the sidewalls of the handle, wherein one of the sidewalls of the handle has a sharp edge for cutting a string extending through the aperture of the handle.

2. The device in accordance with claim 1, wherein the sharp edge is on a sidewall spaced from the ring.

3. A trolling release device in combination with fishing equipment, the combination comprising:
   (a) a ring having peripheral sidewalls with an aperture formed between the sidewalls and a radial slit in one of the sidewalls for extending a tow line through the sidewalls and into the aperture, the ring being positioned around the tow line;
   (b) a handle rigidly mounted to the ring, the handle having peripheral sidewalls with an aperture formed between the sidewalls and a radial slit in one of the sidewalls of the handle, and one of the handle sidewalls has a sharp edge on one of the sidewalls that is spaced from the ring;
   (c) a string, extending through the aperture of the handle and mounted to a fishing line, wherein a sufficient tensile force applied to the string causes the string to be cut by the sharp edge.

4. A method for using a trolling release device, the method comprising:
   (a) mounting a ring, the ring having peripheral sidewalls and an aperture formed between the sidewalls to a tow line by extending the tow line through a radial slit in one of the sidewalls of the ring;
   (b) extending a string through a radial slit in a sidewall of a handle that is rigidly mounted to the ring, the handle having peripheral sidewalls with an aperture formed between the sidewalls and a sharp edge on one of the handle sidewalls; and
   (c) mounting the string onto a fishing line.

5. The method in accordance with claim 4, further comprising (a) releasing the tow line from a planer board; and then (b) collecting the trolling release device for reuse.

6. A trolling release device for use during fishing, the trolling release device comprising: (a) a ring having peripheral sidewalls with an aperture formed between the sidewalls; (b) a radial slit in one of the sidewalls for extending a tow line and a string through the slit and into the aperture; and (c) a sharp edge formed on one of the sidewalls for cutting the string extending through the aperture.

* * * * *